United States Patent
Lee et al.

(10) Patent No.: US 11,503,518 B2
(45) Date of Patent: Nov. 15, 2022

(54) REFERENCE POINT DETERMINATION

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US); Tao Luo, San Diego, CA (US); Hung Dinh Ly, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 16/381,832

(22) Filed: Apr. 11, 2019

(65) Prior Publication Data

US 2019/0320360 A1    Oct. 17, 2019

Related U.S. Application Data

(60) Provisional application No. 62/657,555, filed on Apr. 13, 2018.

(51) Int. Cl.
| | |
|---|---|
| *H04W 36/00* | (2009.01) |
| *H04W 36/08* | (2009.01) |
| *H04W 36/30* | (2009.01) |
| *H04W 40/24* | (2009.01) |
| *H04W 48/16* | (2009.01) |
| *H04W 56/00* | (2009.01) |
| *H04W 72/04* | (2009.01) |
| *H04W 88/02* | (2009.01) |

(Continued)

(52) U.S. Cl.
CPC ..... *H04W 36/00837* (2018.08); *H04W 36/08* (2013.01); *H04W 36/30* (2013.01); *H04W 40/244* (2013.01); *H04W 48/16* (2013.01); *H04W 56/001* (2013.01); *H04W 72/0453* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2019/0021119 A1* | 1/2019 | Ng | H04W 72/0453 |
| 2019/0074886 A1* | 3/2019 | Yoon | H04L 5/0048 |

(Continued)

OTHER PUBLICATIONS

U.S. Appl. No. 62/652,490, Abdoli, filed Apr. 4, 2018 (Year: 2018).*

(Continued)

*Primary Examiner* — Jay L Vogel
(74) *Attorney, Agent, or Firm* — QUALCOMM Incorporated

(57) ABSTRACT

Various aspects of the present disclosure generally relate to wireless communication. In some aspects, a user equipment may receive, from a base station and based at least in part on a triggering event, an indication of a frequency domain indexing configuration for a relative reference point. The user equipment may use at least one of a start of a control resource set or an absolute reference point for the relative reference point based at least in part on the indication of the frequency domain indexing configuration. Numerous other aspects are provided.

29 Claims, 9 Drawing Sheets

(51) Int. Cl.
*H04W 48/12* (2009.01)
*H04L 5/00* (2006.01)

(56) References Cited

U.S. PATENT DOCUMENTS

| | | | | |
|---|---|---|---|---|
| 2019/0082431 | A1* | 3/2019 | Yi | H04W 72/042 |
| 2019/0149286 | A1* | 5/2019 | Zhang | H04W 72/0453 370/329 |
| 2019/0149421 | A1* | 5/2019 | Jin | H04W 36/125 370/331 |
| 2019/0313377 | A1* | 10/2019 | Abdoli | H04L 1/0072 |
| 2020/0221428 | A1* | 7/2020 | Moon | H04W 16/28 |
| 2020/0229180 | A1* | 7/2020 | Liu | H04W 72/0453 |
| 2020/0236638 | A1* | 7/2020 | Song | H04W 56/00 |
| 2020/0280415 | A1* | 9/2020 | Chen | H04L 25/0224 |

OTHER PUBLICATIONS

Ng, U.S. Appl. No. 62/531,777, filed Jul. 12, 2017 (Year: 2017).*
U.S. Appl. No. 62/556,513, filed 2017.*
U.S. Appl. No. 62/567,208, filed Oct. 2, 2017 (Year: 2017).*
Huawei et al., "On NR-PDCCH Structure", 3GPP Draft; R1-1719386, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 18, 2017, (Nov. 18, 2017), 7 Pages, XP051369295, Retrieved from the Internet: URL: http://www.3gpp.org/ftp/tsg_ran/WG1_RL1/TSGR1_91/Docs/ [retrieved on Nov. 18, 2017].
International Search Report and Written Opinion—PCT/US2019/027178—ISA/EPO—dated Jun. 26, 2019.
Nokia, et al., "On Remaining Aspects of BWPs," 3GPP Draft; R1-1718607 on Remaining Aspects of BWPs, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051341781, 6 pages, Retrieved from the Internet: URL: http://www.3gpp.org/ftp/tsg_ran/WG1_RL1/TSGR1_90b/Docs/ [retrieved on Oct. 8, 2017], Section 2.4.
NTT Docomo et al: "Offline Summary for AI 7.3.1.2 Remaining Details on Search Space," 3GPP Draft; R1-1721414, 3rd Generation Partnership Project (3GPP), Mobile Competence Centre; 650, Route Des Lucioles; F-06921 Sophia-Antipolis Cedex, France, vol. RAN WG1, No. Reno, USA; Nov. 27, 2017-Dec. 1, 2017, Nov. 28, 2017 (Nov. 28, 2017), XP051363871, pp. 1-24, Retrieved from the Internet: URL:http://www.3gpp.org/ftp/Meetings_3GPP_SYNC/RAN1/Docs/ [retrieved on Nov. 28, 2017], Section 1.2 and 1.4.
NTT Docomo., et al., "Offline Summary for AI 7.3.1.1 Remaining Details on PDCCH Structure", 3GPP TSG RAN WG1 Meeting 91, 3GPP Draft, R1-1721413, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 28, 2017 (Nov. 28, 2017), pp. 1-5, XP051363870, Retrieved from the Internet: URL: https://www.3gpp.org/ftp/tsg_ran/WG1_RL1/TSGR1_91/Docs, [retrieved on Nov. 28, 2017].

* cited by examiner

REFERENCE POINT DETERMINATION

CROSS-REFERENCE TO RELATED APPLICATIONS UNDER 35 U.S.C. § 119

This application claims priority to U.S. Provisional Patent Application No. 62/657,555, filed on Apr. 13, 2018, entitled "TECHNIQUES AND APPARATUSES FOR REFERENCE POINT DETERMINATION," which is hereby expressly incorporated by reference herein.

FIELD OF THE DISCLOSURE

Aspects of the present disclosure generally relate to wireless communication and to techniques and apparatuses for reference point determination.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station and based at least in part on a triggering event, an indication of a frequency domain indexing configuration for a relative reference point; and using at least one of a start of a control resource set or an absolute reference point for the relative reference point based at least in part on the indication of the frequency domain indexing configuration.

In some aspects, a UE for wireless communication may include memory and one or more processors operatively coupled to the memory. The memory and the one or more processors may be configured to receive, from a base station and based at least in part on a triggering event, an indication of a frequency domain indexing configuration for a relative reference point; and use at least one of a start of a control resource set or an absolute reference point for the relative reference point based at least in part on the indication of the frequency domain indexing configuration.

In some aspects, a non-transitory computer-readable medium may store one or more instructions for wireless communication. The one or more instructions, when executed by one or more processors of a UE, may cause the one or more processors to: receive, from a base station and based at least in part on a triggering event, an indication of a frequency domain indexing configuration for a relative reference point; and use at least one of a start of a control resource set or an absolute reference point for the relative reference point based at least in part on the indication of the frequency domain indexing configuration.

In some aspects, an apparatus for wireless communication may include means for receiving, from a base station and based at least in part on a triggering event, an indication of a frequency domain indexing configuration for a relative reference point; and means for using at least one of a start of a control resource set or an absolute reference point for the relative reference point based at least in part on the indication of the frequency domain indexing configuration.

Aspects generally include a method, apparatus, system, computer program product, non-transitory computer-readable medium, user equipment, base station, wireless communication device, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
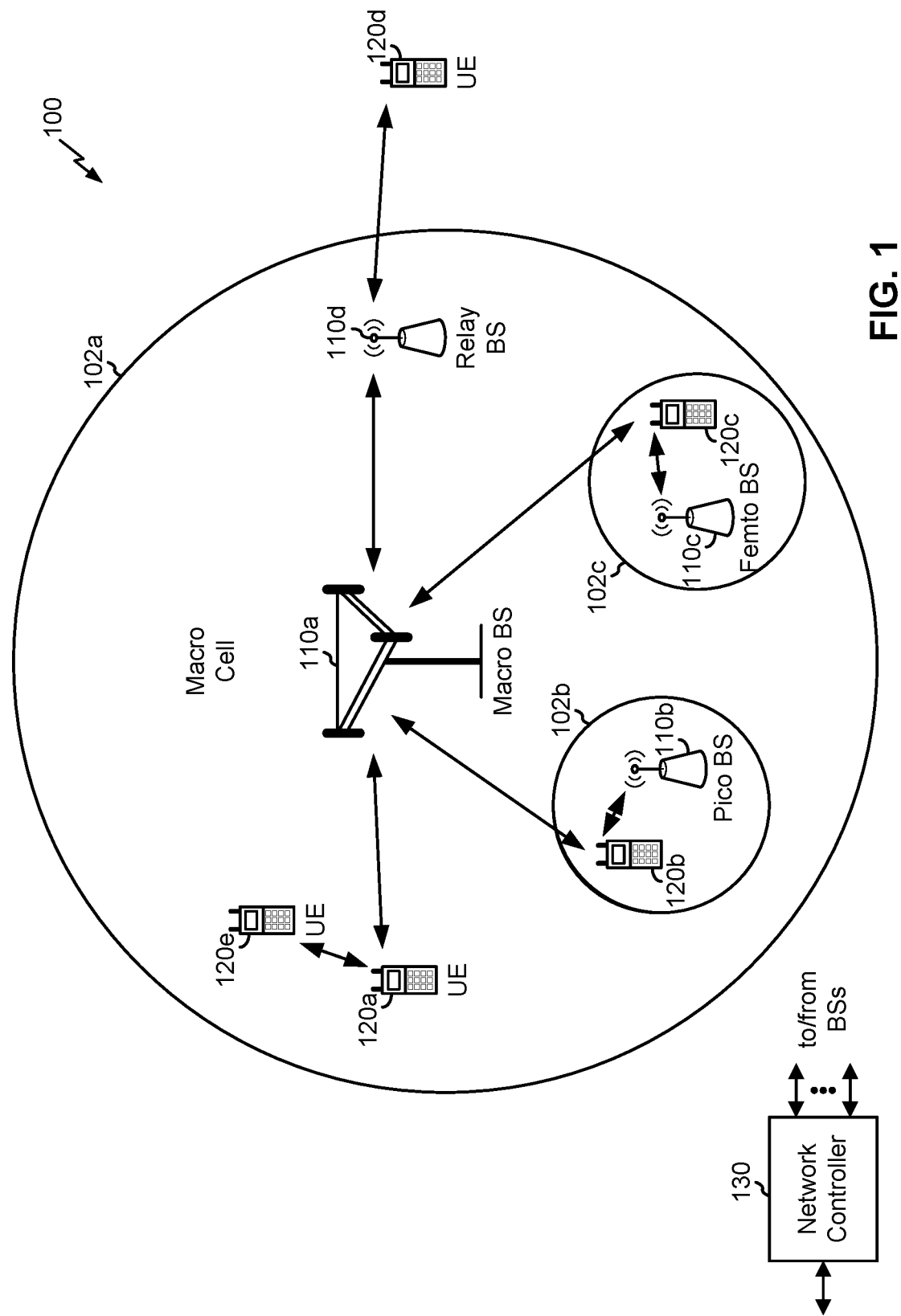
FIG. 1 is a block diagram conceptually illustrating an example of a wireless communication network, in accordance with various aspects of the present disclosure.

In some communications systems, such as 5G or NR, a relative reference point for a frequency domain may be used to synchronize communication. A UE may communicate using a set of physical resource blocks allocated for a bandwidth part, and may identify the set of physical resource blocks based at least in part on physical resource block indices. The UE may use the relative reference point to define resource allocations corresponding to the physical resource block indices. For example, the UE may determine that a physical resource block (with an index of 0) is to occur based at least in part on a defined absolute reference point of a communication structure. The UE may determine a configuration for a physical resource block 0 of an initial downlink bandwidth part and/or an initial control resource set (CORESET) based at least in part on a physical broadcast channel (PBCH). The UE may determine a configuration for a physical resource block 0 of a bandwidth part at least in part on remaining minimum system information (RMSI) message.

However, some triggering events may result in an ambiguity in resolving physical resource block indexing in the frequency domain. For example, after a handover, the UE may determine an initial bandwidth part for a cell, but the UE may not have information identifying whether a configured bandwidth part and/or CORESET resulting from the handover, is the configured bandwidth part and/or CORESET for initial access. This may occur based at least in part on the UE determining the cell based at least in part on the handover and not based at least in part on an initial access procedure. As a result, the UE may incorrectly determine the physical resource block indexing. Moreover, in some cases, the UE may have a plurality of options for defining a relative reference point, such as an absolute reference point, based at least in part on a plurality of available cells (e.g., serving cells, neighbor cells, and/or the like). In this case, ambiguity in resolving an absolute reference point may result in a failure of radio resource management measurements.

Some aspects described herein may enable reference point determination. For example, the UE may determine an indexing configuration for physical resource block indexing based at least in part on receiving an indication from a BS. For example, the UE may receive an indication to configure physical resource block indexing based at least in part on a start of a CORESET (e.g., for localized physical resource block indexing specific to the CORESET) or based at least in part on a defined absolute reference point (e.g., for global physical resource block indexing for multiple bandwidth parts and physical channels/signals). In some aspects, the UE may receive an indication identifying a configuration for selecting an absolute reference point of a plurality of candidate absolute reference point's. In this way, the UE may accurately resolve a communication structure for communicating with the BS, thereby reducing a likelihood of a communication interruption and improving network performance relative to the UE having ambiguity and inaccuracy in resolving the physical resource block indexing and/or an absolute reference point used therein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, such as based at least in part on a relative reference point, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
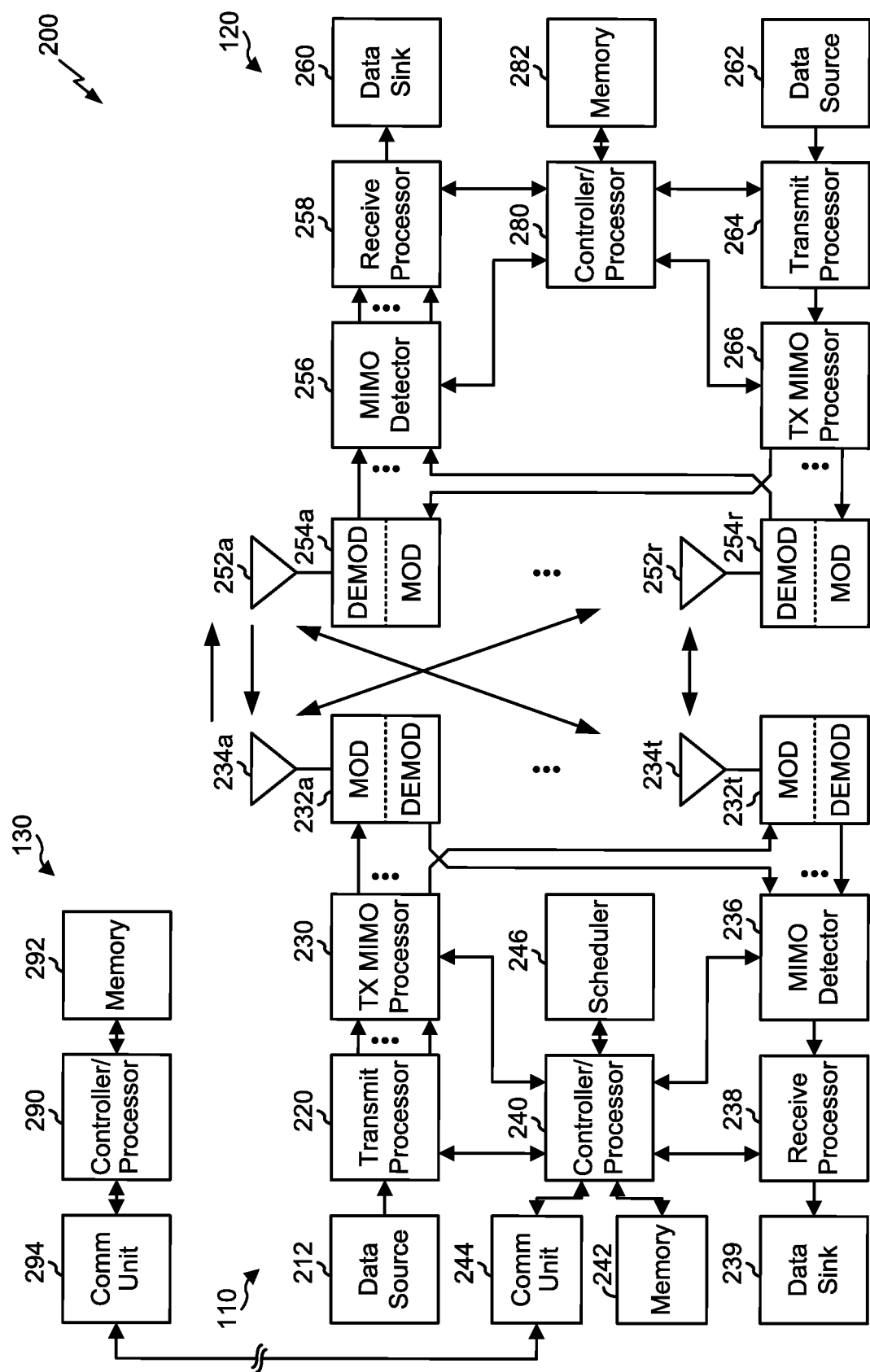
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. UE 120 may receive the downlink signals and/or provide uplink signals based at least in part on determining a relative reference point for a frequency domain physical resource block indexing configuration. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with reference point determination, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

Figure 8:
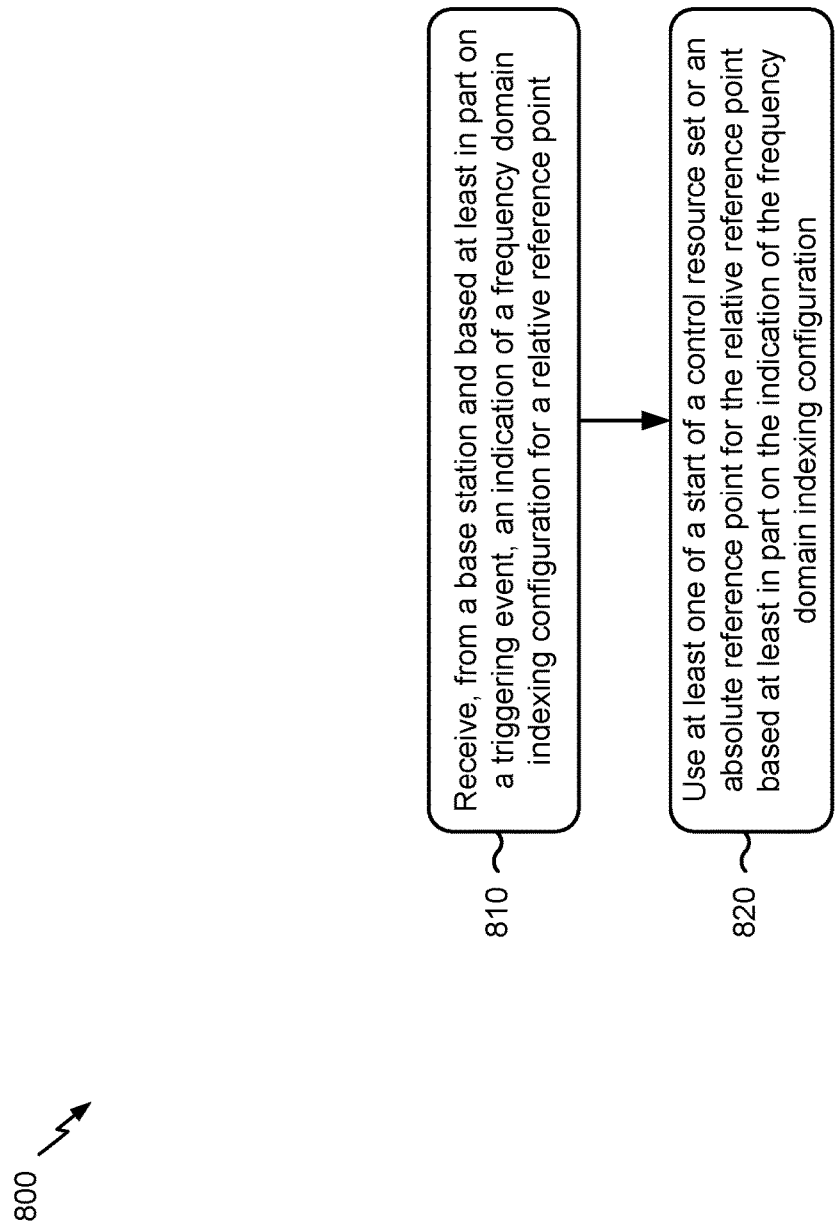
FIG. 8 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 800 of FIG. 8 and/or other processes as described herein. The stored program codes, when executed by processor 240 and/or other processors and modules at base station 110, may cause the base station 110 to perform operations described with respect processes as described herein. A scheduler 246 may schedule UEs for data transmission on the downlink and/or uplink.

In some aspects, UE 120 may include means for receiving, from BS 110 and based at least in part on a triggering event, an indication of a frequency domain indexing configuration for a relative reference point, and means for using at least one of a start of a control resource set or an absolute reference point for the relative reference point based at least in part on the indication of the frequency domain indexing configuration, and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
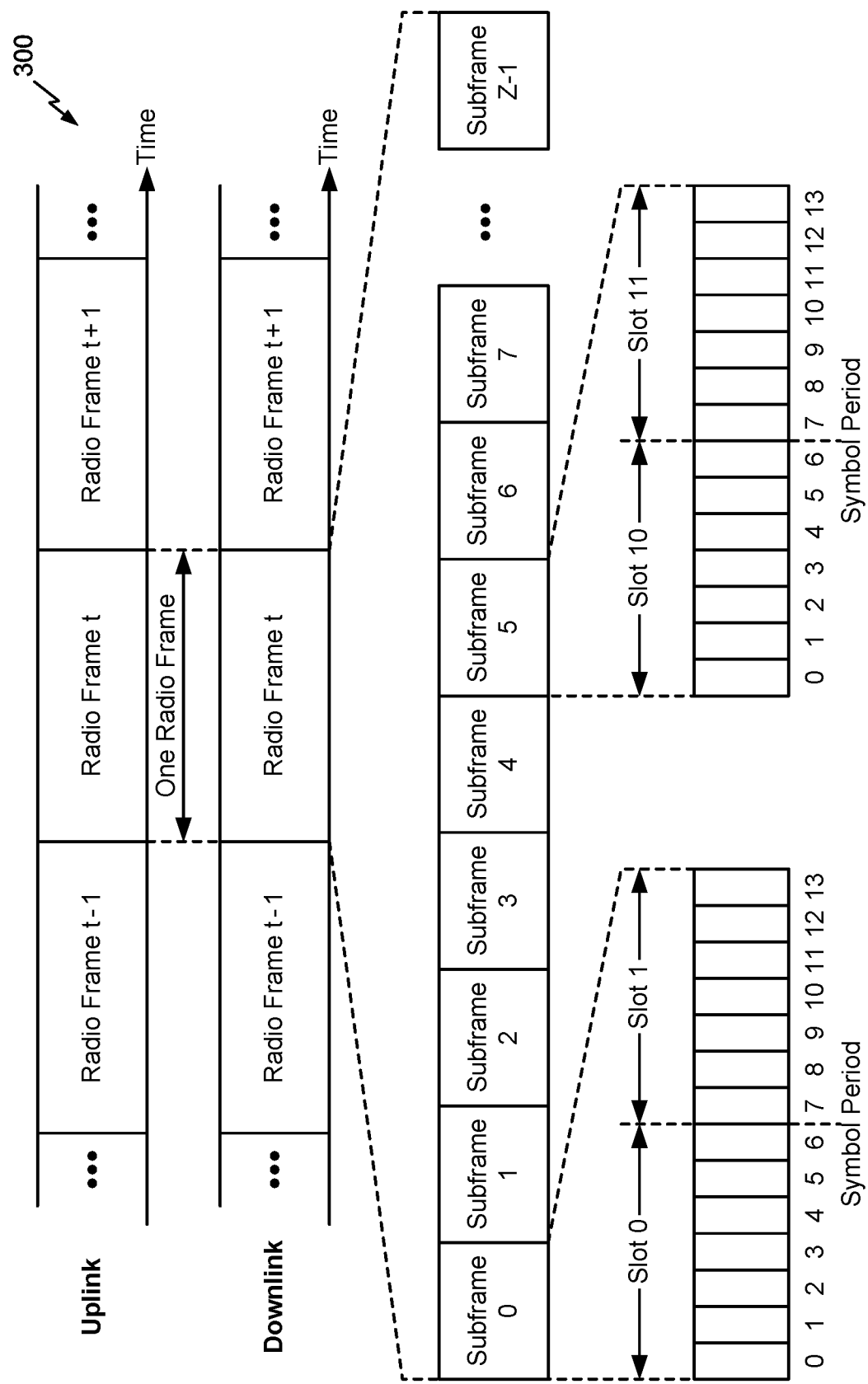
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. The BS may determine a configuration for physical resource block indexing based at least in part on whether a component carrier includes an SS/PBCH block.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
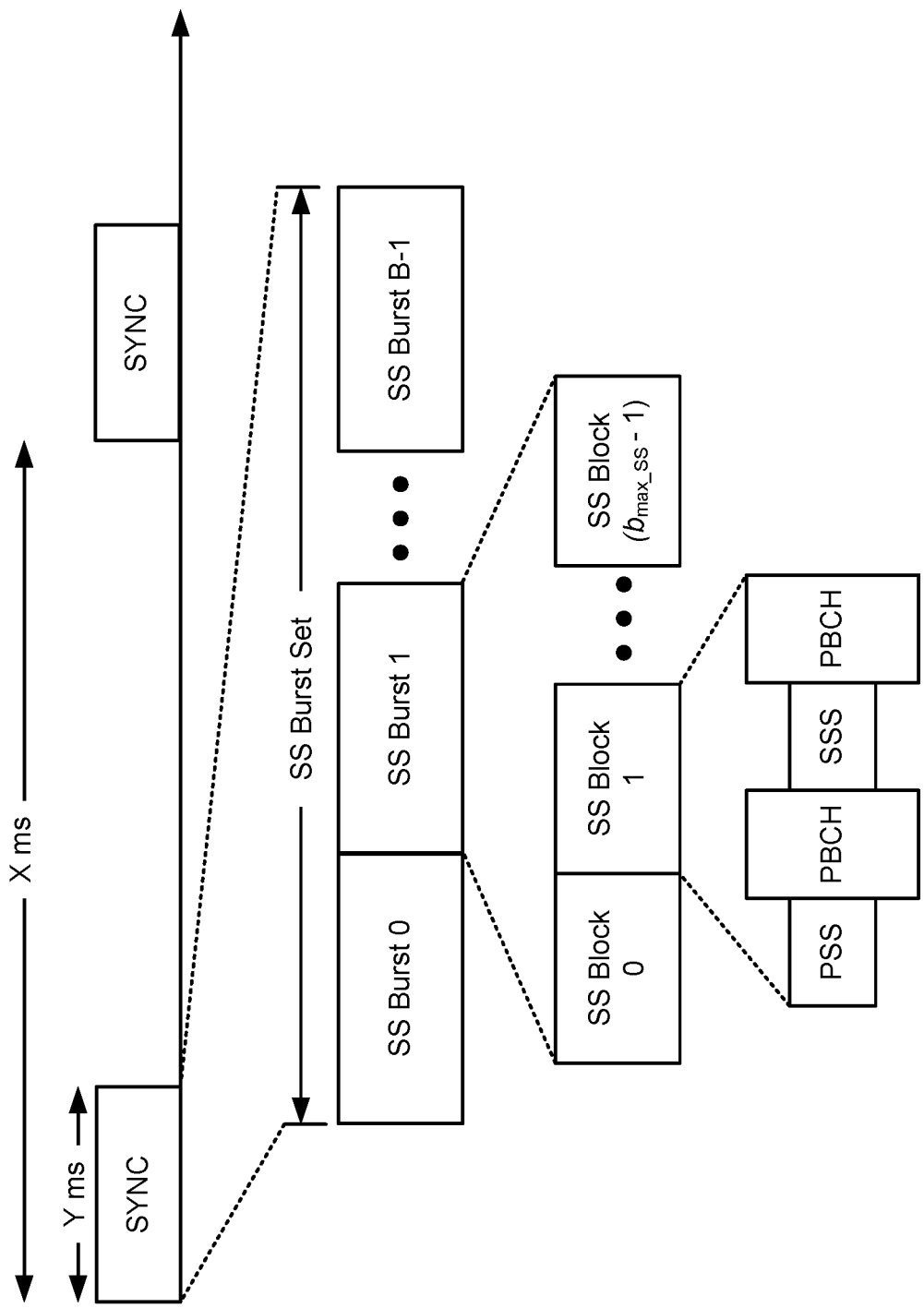
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
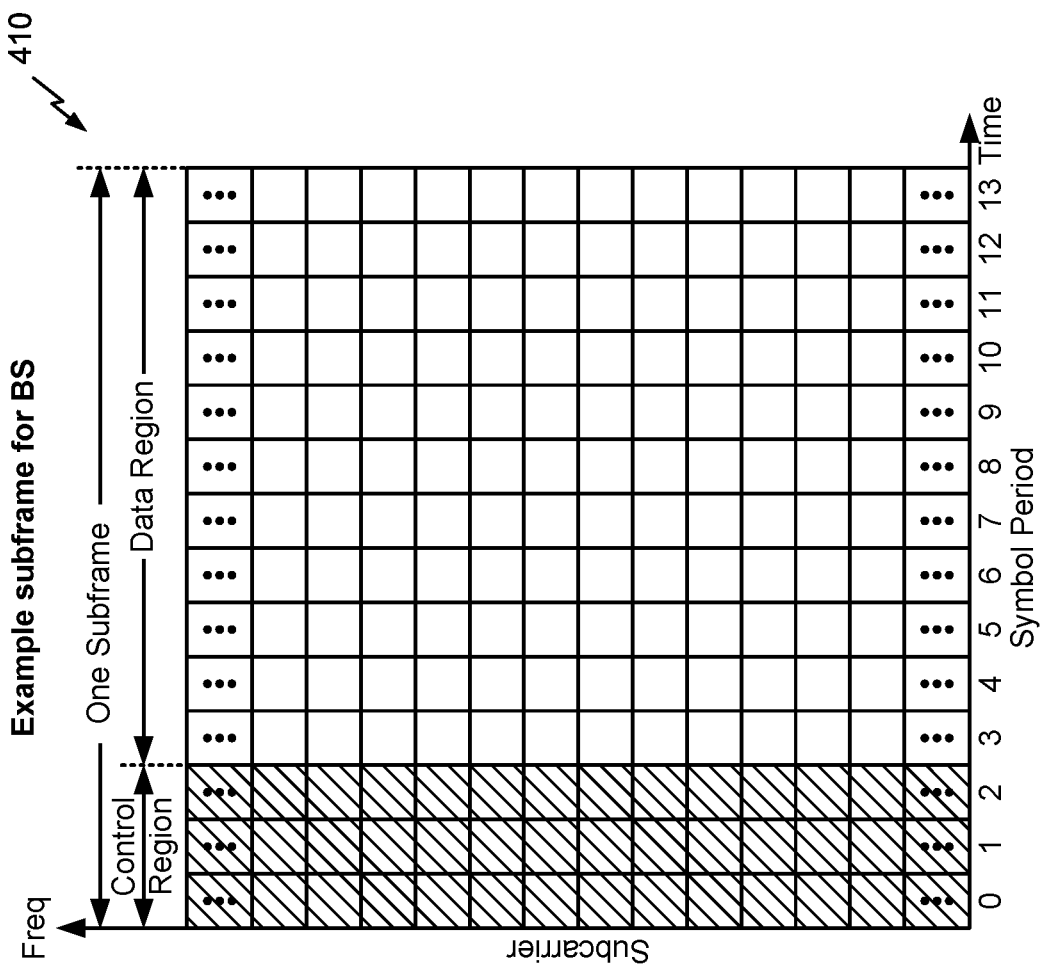
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
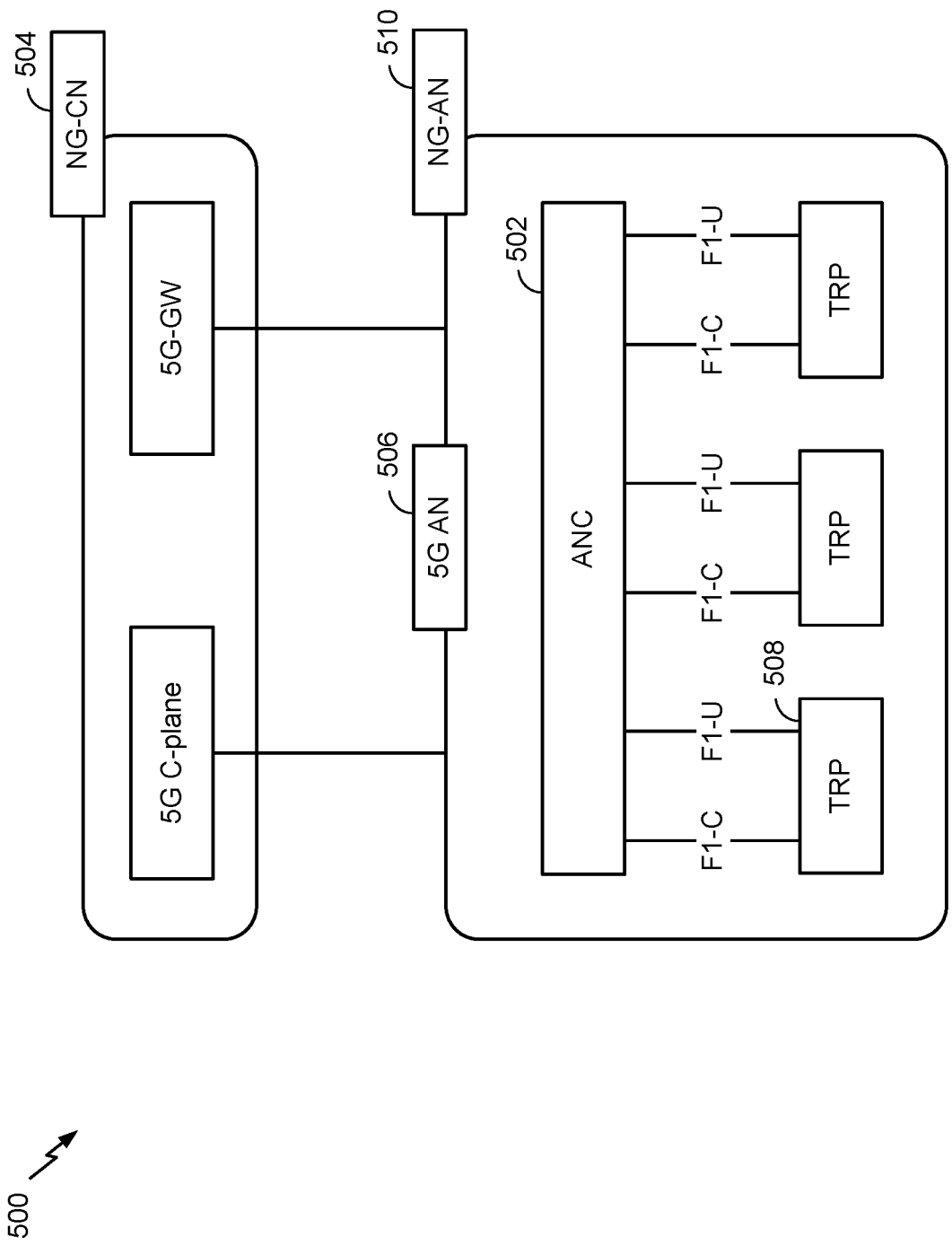
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
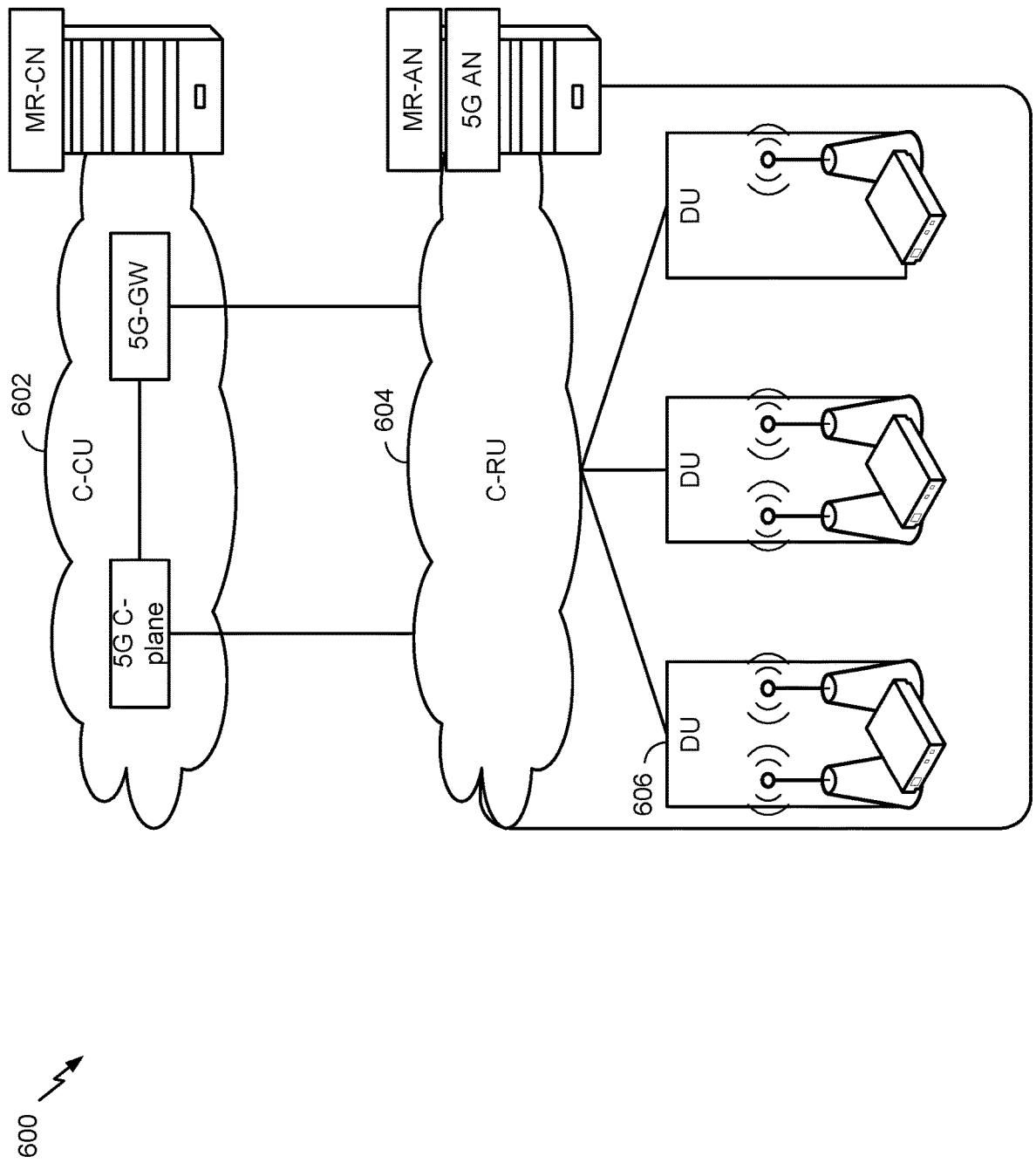
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
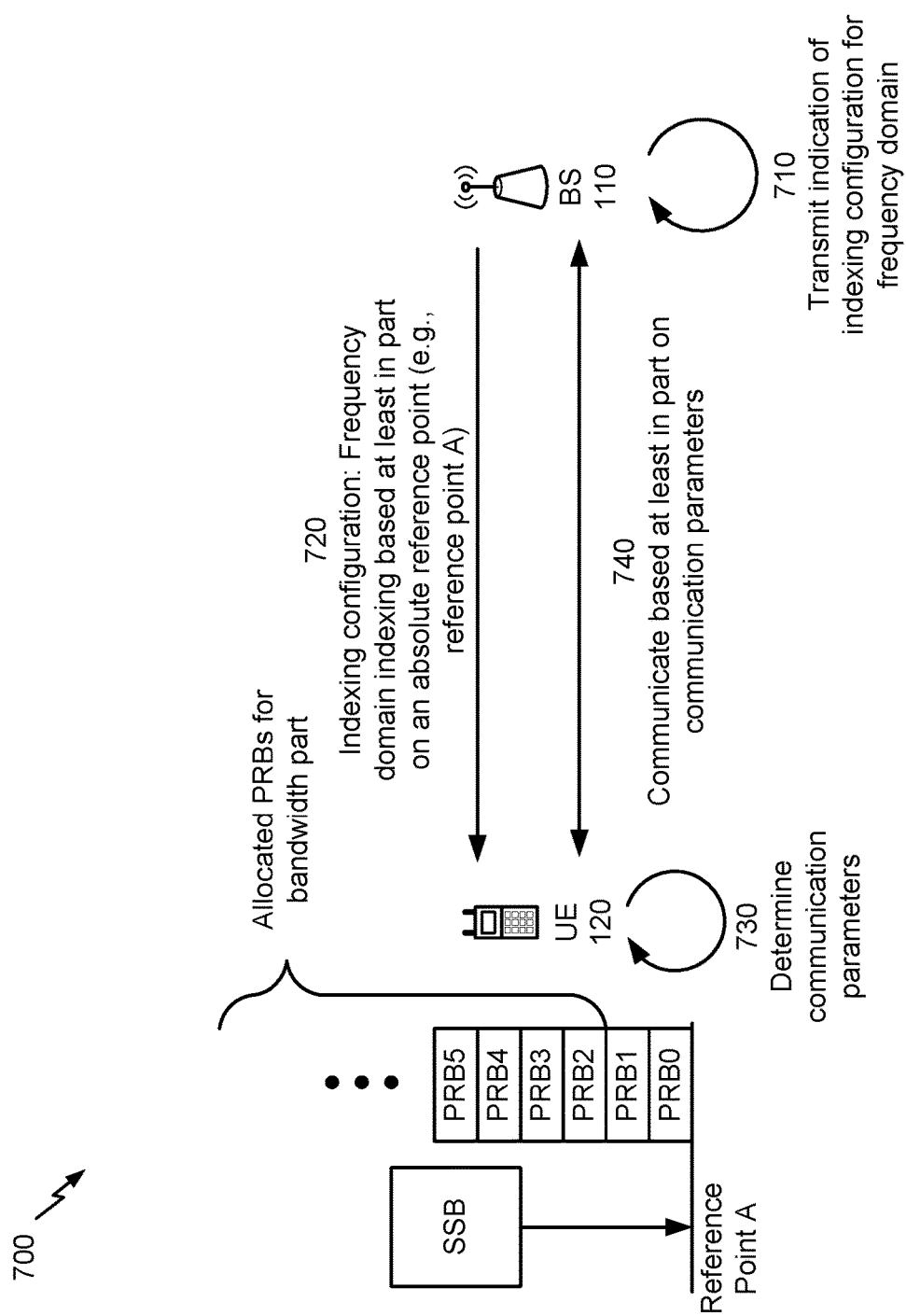
FIG. 7 is a diagram illustrating an example of reference point determination, in accordance with various aspects of the present disclosure.

FIG. 7 is a diagram illustrating an example 700 of reference point determination, in accordance with various aspects of the present disclosure. As shown in FIG. 7, example 700 includes a BS 110 and a UE 120.

As further shown in FIG. 7, and by reference numbers 710 and 720, BS 110 may transmit an indication of an indexing configuration for the frequency domain to UE 120, and UE 120 may receive the indication. For example, based at least in part on detecting a triggering event, BS 110 may transmit the indication of the indexing configuration to UE 120. In some aspects, the triggering event may include a handover, a secondary cell configuration (e.g., in a carrier aggregation scenario), a primary secondary cell configuration (e.g., in a dual-connectivity scenario), a bandwidth part configuration, and/or the like. For example, based at least in part on determining that the UE is handed over from a first cell to a second cell, BS 110 may determine to provide the indication of the indexing configuration to resolve an ambiguity in physical resource block indexing for UE 120.

In some aspects, BS 110 may configure physical resource block indexing based at least in part on a presence of a synchronization sequence or physical broadcast channel (SS/PBCH) block. For example, when a component carrier for UE 120 does not include the SS/PBCH block, BS 110 may configure physical resource block indexing based at least in part on a reference point, which may be determined based at least in part on an absolute reference point (e.g., a reference point A, which may be termed 'Point A'). Additionally, or alternatively, when the component carrier includes the SS/PBCH block, BS 110 may configure physical resource block indexing based at least in part on a reference point, which may be determined based at least in part on a start of a CORESET.

In this way, BS 110 reduces a likelihood of a communication interruption and/or a negative impact to network performance relative to the ambiguity resulting in UE 120 failing to successfully decode transmission from BS 110, failing to successfully transmit to UE 120, and/or the like.

As further shown in FIG. 7, and by reference numbers 730 and 740, UE 120 may determine communication parameters, and may communicate based at least in part on the communication parameters. For example, based at least in part on the indication of the indexing configuration, UE 120 may determine physical resource block indexing of a relative reference point (e.g., a reference point) relative to an absolute reference point (e.g., reference point A or Point A) (e.g., a global physical resource block indexing scenario). Additionally, or alternatively, UE 120 may determine physical resource block indexing relative to a start of a CORESET (e.g., a local physical resource block indexing scenario). In some aspects, UE 120 may determine a set of physical resource blocks (PRBs) allocated for a bandwidth part based at least in part on determining the physical resource block indexing relative to, for example, an absolute reference point (e.g., reference point A).

In some aspects, UE 120 may configure a communication parameter relating to a radio resource management measurement. For example, for an intra-frequency radio resource management measurement, UE 120 may determine that a set of channel state information reference signal (CSI-RS) sequences for a serving cell, a neighbor cell, and/or the like is defined based at least in part on the absolute reference point for the serving cell. Additionally, or alternatively, UE 120 may determine the absolute reference point for CSI-RSs for an intra-frequency radio resource management measurement. In some aspects, UE 120 may determine an absolute reference point, for the intra-frequency radio resource management measurement, on a per frequency layer basis (e.g., for a set of cells associated with a common carrier frequency), and may communicate with BS 110 to enable the radio resource management measurement. Additionally, or alternatively, UE 120 may determine an absolute reference point, for the intra-frequency radio resource management measurement, on a per frequency band basis.

Additionally, or alternatively, UE 120 may determine to use a serving cell absolute reference point for an inter-frequency radio resource management measurement. In some aspects, UE 120 may determine an absolute reference point for a radio resource management measurement based at least in part on an absolute channel number (e.g., based at least in part on receiving a UE-specific radio resource control configuration message), based at least in part on an SS/PBCH block frequency, and/or the like. In some aspects, UE 120 may determine an absolute reference point based at least in part on a radio resource control configuration identifying a set of candidate absolute reference point's for a cell and based at least in part on another radio resource control configuration message indicating a particular candidate absolute reference point for UE 120. In this case, based at least in part on determining an absolute reference point, UE 120 may determine a communication structure (e.g., a CSI-RS sequence, a physical resource block index start, and/or the like), and may communicate with BS 110.

As indicated above, FIG. 7 is provided as an example. Other examples may differ from what is described with respect to FIG. 7.

FIG. 8 is a diagram illustrating an example process 800 performed, for example, by a UE, in accordance with various aspects of the present disclosure. Example process 800 is an example where a UE (e.g., UE 120 and/or the like) performs operations associated with reference point determination.

As shown in FIG. 8, in some aspects, process 800 may include receiving, from a base station and based at least in part on a triggering event, an indication of a frequency domain indexing configuration for a relative reference point (block 810). For example, the UE (e.g., using receive processor 258, transmit processor 264, controller/processor 280, memory 282, and/or the like) may receive, from a base station and based at least in part on a triggering event, an indication of a frequency domain indexing configuration for a relative reference point, as described above. In some aspects, the relative reference point may be referred to as 'the reference point' and may be a reference point for a timing parameter k.

As further shown in FIG. 8, in some aspects, process 800 may include using at least one of a start of a control resource set or an absolute reference point for the relative reference point based at least in part on the indication of the frequency domain indexing configuration (block 820). For example, the UE (e.g., using receive processor 258, transmit processor 264, controller/processor 280, memory 282, and/or the like) may use at least one of a start of a control resource set or an absolute reference point for the relative reference point based at least in part on the indication of the frequency domain indexing configuration, as described above.

Process 800 may include additional aspects, such as any single implementation or any combination of aspects described below and/or in connection with one or more other processes described elsewhere herein.

In a first aspect, process 800 may include communicating using a physical channel or signal determined based at least in part on the relative reference point.

In a second aspect, alone or in combination with the first aspect, the physical channel is at least one of a physical broadcast channel (PBCH), a physical downlink control channel (PDCCH), a physical downlink shared channel (PDSCH), a physical uplink control channel (PUCCH), a physical uplink shared channel (PUSCH), a sounding reference signal (SRS), or a channel state information reference signal (CSI-RS). In a third aspect, alone or in combination with any one or more of the first and second aspects, the relative reference point is physical resource block 0 of an initial downlink bandwidth part for the control resource set. In some aspects, the control resource set is configured by a physical channel.

In a fourth aspect, alone or in combination with any one or more of the first through third aspects, the control resource set is control resource set 0 and the relative reference point is the start of the control resource set. In a fifth aspect, alone or in combination with any one or more of the first through fourth aspects, the control resource set is not control resource set 0 and the relative reference point is the absolute reference point. In a sixth aspect, alone or in combination with any one or more of the first through fifth aspects, the relative reference point is determined based at least in part on whether a configured bandwidth part or the control resource set is associated with an initial access procedure.

In a seventh aspect, alone or in combination with any one or more of the first through sixth aspects, the triggering event includes at least one of a handover, a secondary cell configuration, a primary secondary cell configuration, or a bandwidth part configuration. In an eighth aspect, alone or in combination with any one or more of the first through seventh aspects, the relative reference point is determined based at least in part on a component carrier not being associated with a synchronization sequence or physical broadcast channel (SS/PBCH) block. In a ninth aspect, alone or in combination with any one or more of the first through eighth aspects, the absolute reference point of a serving cell defines, for an intra-frequency radio resource management measurement, a channel state information reference signal sequence.

In a tenth aspect, alone or in combination with any one or more of the first through ninth aspects, for an inter-frequency radio resource management measurement, the absolute reference point is defined on a per frequency layer basis or a per frequency band basis. In an eleventh aspect, alone or in combination with any one or more of the first through tenth aspects, for an inter-frequency radio resource management measurement, the absolute reference point is defined based at least in part on a serving cell of the UE or a neighbor cell of the UE. In a twelfth aspect, alone or in combination with any one or more of the first through eleventh aspects, the absolute reference point is defined based at least in part on a radio resource control configuration message and using an absolute channel number.

In a thirteenth aspect, alone or in combination with any one or more of the first through twelfth aspects, the absolute reference point is defined based at least in part on a per frequency layer basis and using an absolute channel number. In a fourteenth aspect, alone or in combination with any one or more of the first through thirteenth aspects, the absolute reference point is defined based at least in part on a radio resource control configuration message and relative to a synchronization sequence or physical broadcast channel (SS/PBCH) block frequency. In a fifteenth aspect, alone or in combination with any one or more of the first through fourteenth aspects, the absolute reference point is defined based at least in part on a candidate absolute reference point of a set of candidate absolute reference points.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, from a base station and based at least in part on a triggering event, an indication of a frequency domain indexing configuration for a relative reference point for a communication, wherein the triggering event includes a handover;
    determining whether a component carrier of the communication includes a synchronization sequence and physical broadcast channel (SS/PBCH) block;
    determining the relative reference point based at least on the indication of the frequency domain indexing configuration, on a start of control resource set in response to the component carrier including the SS/PBCH block, and on an absolute reference point in response to the component carrier not including the SS/PBCH block; and
    communicating the communication based at least in part on the relative reference point.

2. The method of claim 1, wherein the communication uses a physical channel that is at least one of:
    a physical broadcast channel (PBCH),
    a physical downlink control channel (PDCCH),
    a physical downlink shared channel (PDSCH),
    a physical uplink control channel (PUCCH),
    a physical uplink shared channel (PUSCH),
    a sounding reference signal (SRS), or
    a channel state information reference signal (CSI-RS).

3. The method of claim 1, wherein the relative reference point is physical resource block 0 of an initial downlink bandwidth part for the control resource set, and
    wherein the control resource set is configured by a physical channel.

4. The method of claim 1, wherein the control resource set is control resource set 0 and the relative reference point is the start of the control resource set.

5. The method of claim 1, wherein the control resource set is not control resource set 0 and the relative reference point is the absolute reference point.

6. The method of claim 1, wherein the relative reference point is determined based at least in part on whether a configured bandwidth part or the control resource set is associated with an initial access procedure.

7. The method of claim 1, wherein the absolute reference point of a serving cell defines, for an intra-frequency radio resource management measurement, a channel state information reference signal sequence.

8. The method of claim 1, wherein, for an inter-frequency radio resource management measurement, the absolute reference point is defined on a per frequency layer basis or a per frequency band basis.

9. The method of claim 1, wherein, for an inter-frequency radio resource management measurement, the absolute reference point is defined based at least in part on a serving cell of the UE or a neighbor cell of the UE.

10. The method of claim 1, wherein the absolute reference point is defined based at least in part on a radio resource control configuration message and using an absolute channel number.

11. The method of claim 1, wherein the absolute reference point is defined based at least in part on a per frequency layer basis and using an absolute channel number.

12. The method of claim 1, wherein the absolute reference point is defined based at least in part on a radio resource control configuration message.

13. The method of claim 1, wherein the absolute reference point is defined based at least in part on a candidate of a set of candidate absolute reference points.

14. The method of claim 1,
    wherein determining whether the component carrier includes the SS/PBCH block comprises:
        determining that the component carrier does not include the SS/PBCH block, and
    wherein determining the relative reference point comprises:
        determining the relative reference point based on the component carrier not including the SS/PBCH block.

15. A user equipment (UE) for wireless communication, comprising:
    a memory; and
    one or more processors operatively coupled to the memory, the one or more processors configured to:
        receive, from a base station and based at least in part on a triggering event, an indication of a frequency domain indexing configuration for a relative reference point for a communication, wherein the triggering event includes a handover;

determine whether a component carrier of the communication includes a synchronization sequence and physical broadcast channel (SS/PBCH) block;

determine the relative reference point based at least on the indication of the frequency domain indexing configuration, on a start of a control resource set in response to the component carrier including the SS/PBCH block, and on an absolute reference point in response to the component carrier not including the SS/PBCH block; and communicate the communication based at least in part on the relative reference point.

16. The UE of claim 15, wherein the communication uses a physical channel that is at least one of:
a physical broadcast channel (PBCH),
a physical downlink control channel (PDCCH),
a physical downlink shared channel (PDSCH),
a physical uplink control channel (PUCCH),
a physical uplink shared channel (PUSCH),
a sounding reference signal (SRS), or
a channel state information reference signal (CSI-RS).

17. The UE of claim 15, wherein the absolute reference point is physical resource block 0 of an initial downlink bandwidth part for the control resource set, and
wherein the control resource set is configured by a physical channel.

18. The UE of claim 15, wherein the control resource set is control resource set 0 and the relative reference point is the start of the control resource set.

19. The UE of claim 15, wherein the control resource set is not control resource set 0 and the relative reference point is the absolute reference point.

20. The UE of claim 15, wherein the relative reference point is determined based at least in part on whether a configured bandwidth part or the control resource set is associated with an initial access procedure.

21. The UE of claim 15,
wherein, to determine whether the component carrier includes the SS/PBCH block, the one or more processors are configured to:
determine that the component carrier does not include the SS/PBCH block, and
wherein, to determine the relative reference point, the one or more processors are configured to:
determine the relative reference point based on the component carrier not including the SS/PBCH block.

22. A non-transitory computer-readable medium storing one or more instructions for wireless communication, the one or more instructions comprising:
one or more instructions that, when executed by one or more processors of a user equipment (UE), cause the one or more processors to:
receive, from a base station and based at least in part on a triggering event, an indication of a frequency domain indexing configuration for a relative reference point for a communication, wherein the triggering event includes a handover;
determine whether a component carrier of the communication includes a synchronization sequences and physical broadcast channel (SS/PBCH) block;
determine the relative reference point based at least on the indication of the frequency domain indexing configuration, on a start of a control resource set in response to the component carrier including the SS/PBCH block, and on an absolute reference point in response to the component carrier no including the SS/PBCH block; and
communicate the communication based at least in part on the relative reference point.

23. The non-transitory computer-readable medium of claim 22, wherein the communication uses a physical channel that is at least one of:
a physical broadcast channel (PBCH),
a physical downlink control channel (PDCCH),
a physical downlink shared channel (PDSCH),
a physical uplink control channel (PUCCH),
a physical uplink shared channel (PUSCH),
a sounding reference signal (SRS), or
a channel state information reference signal (CSI-RS).

24. The non-transitory computer-readable medium of claim 22, wherein the absolute reference point is physical resource block 0 of an initial downlink bandwidth part for the control resource set, and
wherein the control resource set is configured by a physical channel.

25. The non-transitory computer-readable medium of claim 22, wherein the control resource set is control resource set 0 and the relative reference point is the start of the control resource set.

26. An apparatus for wireless communication, comprising:
means for receiving, from a base station and based at least in part on a triggering event, an indication of a frequency domain indexing configuration for a relative reference point for a communication, wherein the triggering event includes a handover;
means for determining whether a component carrier on the communication includes a synchronization sequence and physical broadcast channel (SS/PBCH) block;
means for determining the relative reference point based at least on the indication of the frequency domain indexing configuration, on a start of a control resource set in response to the component carrier including the SS/PBCH block, an on an absolute reference point in response to the component carrier not including the SS/PBCH block; and
means for communicating the communication based at least in part on the relative reference point.

27. The apparatus of claim 26, wherein the communication uses a physical channel that is at least one of:
a physical broadcast channel (PBCH),
a physical downlink control channel (PDCCH),
a physical downlink shared channel (PDSCH),
a physical uplink control channel (PUCCH),
a physical uplink shared channel (PUSCH),
a sounding reference signal (SRS), or
a channel state information reference signal (CSI-RS).

28. The apparatus of claim 26, wherein the absolute reference point is physical resource block 0 of an initial downlink bandwidth part for the control resource set, and
wherein the control resource set is configured by a physical channel.

29. The apparatus of claim 26, wherein the control resource set is control resource set 0 and the relative reference point is the start of the control resource set.

* * * * *